(12) United States Patent
Goraguer

(10) Patent No.: US 7,234,851 B2
(45) Date of Patent: Jun. 26, 2007

(54) PROJECTOR COMPRISING A GLASS LENS AND A PLASTIC LENS SUPPORT AND TOOL FOR OVERMOULDING THE SUPPORT OF THE LENS

(75) Inventor: Daniel Goraguer, Rouen (FR)

(73) Assignee: Holophane S.A., Les Andelys (FR)

( * ) Notice: Subject to any disclaimer, the term of this patent is extended or adjusted under 35 U.S.C. 154(b) by 126 days.

(21) Appl. No.: 10/506,072

(22) PCT Filed: Feb. 18, 2003

(86) PCT No.: PCT/FR03/00535

§ 371 (c)(1),
(2), (4) Date: Aug. 31, 2004

(87) PCT Pub. No.: WO03/074251

PCT Pub. Date: Sep. 12, 2003

(65) Prior Publication Data

US 2005/0128762 A1 Jun. 16, 2005

(30) Foreign Application Priority Data

Mar. 1, 2002 (FR) ................................. 02 02720

(51) Int. Cl.
*B60Q 1/00* (2006.01)
(52) U.S. Cl. ....................................... 362/507; 362/538
(58) Field of Classification Search ................ 362/507, 362/538, 546, 487, 520, 521, 522
See application file for complete search history.

(56) References Cited

U.S. PATENT DOCUMENTS

| 2,193,935 A | 3/1940 | Mulcahy |
| 2,559,860 A | 7/1951 | Fay |
| 3,971,841 A | 7/1976 | Rubinstein |
| 5,746,491 A * | 5/1998 | Tatsukawa .................. 362/507 |
| 6,086,231 A | 7/2000 | Kawaguti et al. |
| 6,132,068 A * | 10/2000 | Katsumata .................. 362/351 |
| 6,857,768 B2 * | 2/2005 | Watanabe et al. ............ 362/512 |
| 2002/0057577 A1 * | 5/2002 | Oschmann et al. ......... 362/507 |
| 2002/0122311 A1 * | 9/2002 | Iwase ......................... 362/520 |

FOREIGN PATENT DOCUMENTS

| EP | 0 936 402 A1 | 8/1999 |
| FR | 2 630 526 A | 10/1989 |
| FR | 2 749 062 A | 11/1997 |

* cited by examiner

Primary Examiner—Renee Luebke
Assistant Examiner—Julie A. Shallenberger
(74) Attorney, Agent, or Firm—Edell, Shapiro & Finnan LLC

(57) ABSTRACT

A lamp including a lens support (1) and a glass lens (2) designed to be placed in front of a light source (5), said lens being assembled to the lens support which is secured to the light source, said support being made of a plastics material, said lens having a rear face (22) designed to face towards the light source, an optical front face (21), and a peripheral rim (23) which interconnects the rear face and the front face, the lens support coming into engagement with the lens at said rim, said lamp being characterized in that the support (1) is fixed to the lens (2) by overmolding, the plastics material of which the support is made surrounding the rim (23) of the lens at least in part.

17 Claims, 4 Drawing Sheets

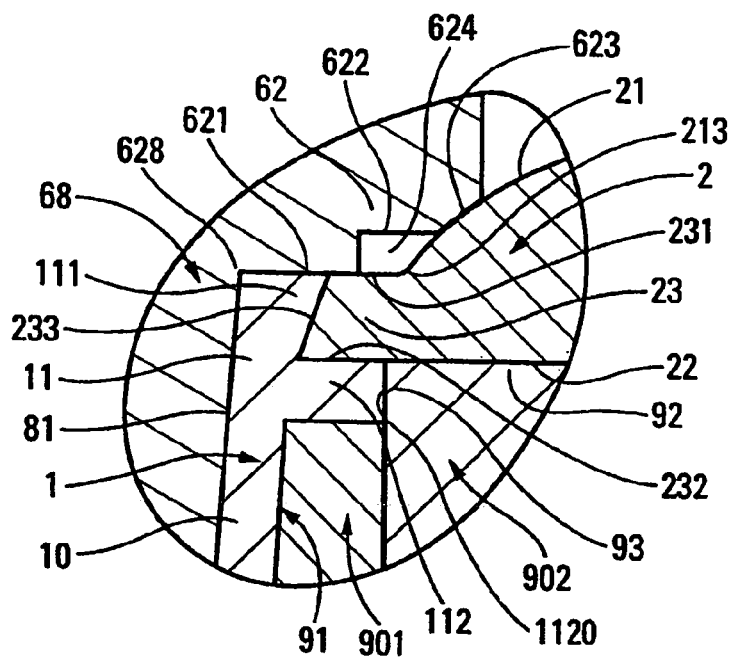
Fig. 4a
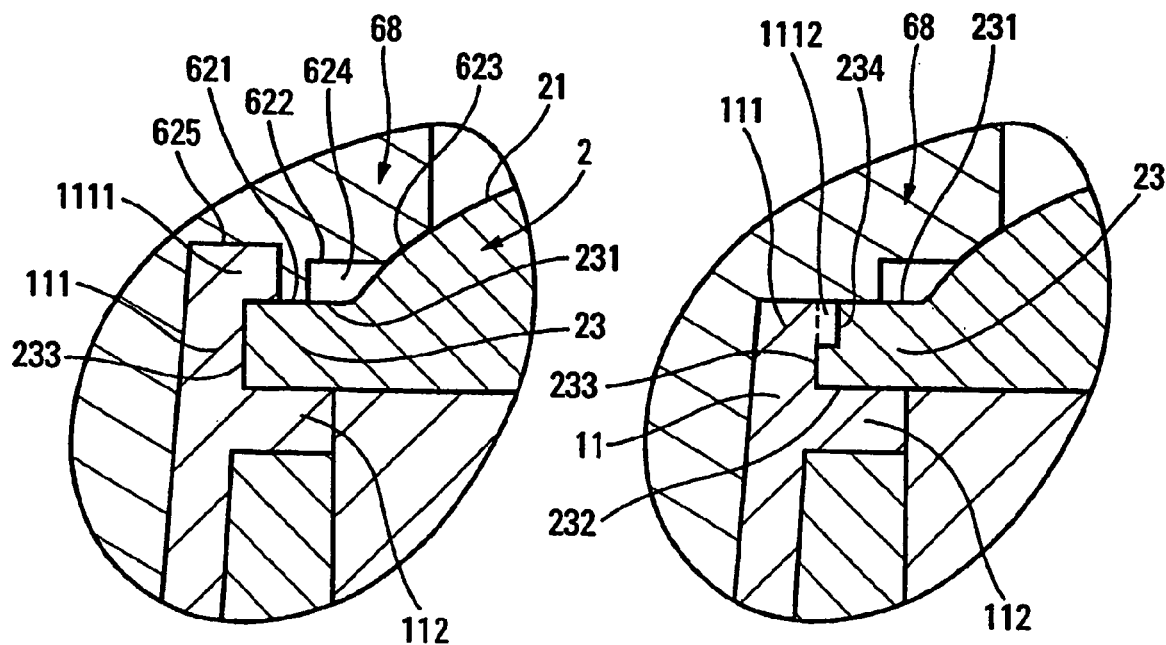
Fig. 4b
Fig. 4c

PROJECTOR COMPRISING A GLASS LENS AND A PLASTIC LENS SUPPORT AND TOOL FOR OVERMOULDING THE SUPPORT OF THE LENS

The present invention relates to a lamp, such as a vehicle headlight whose purpose is to light up the road or the route ahead of the vehicle. However, a lamp of the present invention can also be used in any type of lighting appliance, such as, for example, an overhead projector, a slide viewer, etc. The present invention is thus not limited to the particular use made of the lamp whose primary function is to illuminate or more precisely to direct a light beam in a given direction. In order to generate such a light beam, a light source must be placed in the lamp. The light source also generates heat and, in a motor vehicle headlight, that heat is considerable. It is therefore necessary to use materials adapted to withstanding such heat. This applies for all types of lamp serving to emit light. However, a preferred use remains use as a motor vehicle headlight. The present invention also relates to an overmolding tool for molding the lens support.

The particular type of lamp of the invention includes a lens support made of a plastics material and assembled to a reflector inside which a light source, e.g. a bulb, is placed. The lens support connected to the reflector also serves as support means for supporting an elliptical or aspherical lens which is preferably made of glass. Conventionally, such a lens has a substantially plane rear face facing towards the light source, i.e. towards the inside of the lamp, and an optical front face that is usually convex and that faces towards the outside of the lamp. However, the rear face can be convex or can have some other shape entirely. In addition, this type of lens is provided with a peripheral rim which connects its front face to its rear face. The peripheral rim serves in most cases as a member via which the lens can be held by the lens support. In other words, the lens support is fixed to the lens at the rim.

The present invention relates more particularly to the fixing mode whereby the glass lens is fixed to the lens support which is made of a plastics material. Numerous techniques already exist that are used to fix the lens to the lens support. The most well known fixing techniques use bonding with adhesive, snap-fastening, crimping, or other mechanical holding systems having deformable catches or pivotally mounted levers.

Those prior art fixing techniques suffer from drawbacks, in particular, the techniques using snap-fastening, crimping, or a mechanical holding system. A first drawback lies in the fact that, when the lens is made of glass, which it always is nowadays, said lens is relatively fragile and prone to breaking when it is subjected to an impact or to an excessive load. That applies precisely with the prior art fixing techniques in which it is difficult to control the forces or pressures generated by the snap-fastening, the crimping, or the mechanical holding means. As a result, in practice, the breakage rate for lenses during assembly is relatively large. A first object of the present invention is to remedy that drawback by reducing considerably, or even to zero, lens breakage rate while the lens is being assembled to the lens support.

Another problem related to fixing the lens to the lens support lies in the fact that the thickness of the rim on the lens can vary with tolerance conventionally being $3/10^{ths}$ of a millimeter (mm). Given that it is the optical front face that must be positioned with precision relative to the light source because of its technical characteristics, it is very advantageous to use the front face and/or the front portion of the rim surrounding the front face as a reference for positioning the lens relative to the lens support. No fixing system in which the lens is placed on the lens via its rear face can guarantee that the front face is positioned properly relative to the light source. That can result in degraded optical characteristics for the lamp as a whole. Therefore, another object of the present invention is to guarantee that the optical front face of the lens is positioned with optical precision relative to the lens support.

In order to solve those prior art problems, the present invention proposes for the support to be fixed to the lens by overmolding, the plastics material of which the support is made surrounding the rim of the lens at least in part. By means of the overmolding technique, it is possible to control with precision and to reproduce in automated manner a constant pressing force on the lens at the time at which the lens support is overmolded, i.e. injected around at least a portion of the rim of the lens. In addition, it is possible to position the lens in the mold by using its optical face and/or the portion of the rim that is adjacent to the optical face as a reference. In addition, all of the problems related to tolerance on the thickness of the rim are eliminated, any variation in the said thickness being compensated by a corresponding variation in the plastics material of which the lens support is made. Thus, it is possible to assemble the glass lens to a lens support that is made of an overmolded plastics material, the assembly being performed in fully automated or robotized manner, and with a very low or even zero breakage rate during assembly, while guaranteeing that the lens is positioned accurately relative to the lens support.

Advantageously, the rim has an annular rear portion which advantageously extends in the same plane as the substantially plane rear face, an annular front portion which extends around the front face, and an edge portion which interconnects the rear portion and the front portion, the lens support coming into contact, at least in part, with the rear portion and with the edge portion of the rim. Optionally, the lens support extends over the front portion of the rim at least in part. In a variant, the edge portion of the rim is beveled, tapered, or conical towards the front portion.

In another embodiment, it is also possible for the rim to be provided with at least one notch for preventing it from moving in rotation. Advantageously, the notch is formed in the front portion and in the edge portion without extending to the rear portion.

The present invention also relates to an overmolding tool or mold making it possible to mold a lens support over a lens. In the invention, said lens has an abutment member designed to receive a lens on the optical front face thereof by preferably coming into abutment against a front portion of the rim and against the front face, and a moving pusher element designed to come into pressing contact against the rear face of the lens so as to press it against the abutment member. It is thus guaranteed that the lens and more particularly the optical front face of the lens is positioned accurately relative to the lens support. Advantageously, the pusher element is provided with a force regulation system for regulating the pressing force exerted on the rear face of the lens in order to maintain said pressing force at a predetermined and fixed value independently of the thickness of the rim as measured between its front portion and its rear portion. It is thus guaranteed that the lens is always subjected to a constant pressing force which is considerably lower than the critical or limit values at which it can break, but which is high enough to prevent plastic from infiltrating during overmolding. Any risk of the lens breaking is thus avoided. Advantageously, the abutment member has pick-up means for taking hold of the front face of the lens, advantageously by suction.

According to another advantageous characteristic of the invention, the abutment member is formed by a first mold element that is provided with a cavity serving to form the outside portion of the lens support. Advantageously, the pusher element is provided with a peripheral cavity insert portion serving to form an inside peripheral edge of an abutment flange of the lens support which extends under the rim of the lens, so that any variation in the thickness of the rim of the lens does not affect the thickness of the abutment flange. Preferably, the inside portion of the lens support is formed by a second mold element inside which the pusher element is mounted to move, the second mold element being mounted to move relative to the first mold element, the first and second mold elements forming the entire lens support except for the inside peripheral edge of the abutment flange formed by the pusher element. With such an overmolding tool, it is guaranteed that the lens is positioned accurately because a portion of the mold comes directly into abutment against the front face of the lens. It is no longer the lens that is positioned relative to the lens support, but rather it can be said that it is the lens support that is formed in a manner in which it is accurately positioned relative to the pre-existing lens. In addition, by means of these overmolding techniques, it is possible to use lenses that have rims having very considerable tolerances because all of the variations in thickness are automatically and fully compensated by the injected plastics material forming the lens support.

The invention is described more fully below with reference to the accompanying drawings which show embodiments of the invention by way of non-limiting example.

In the Figures:

FIGS. 4a, 4b, and 4c are views on a larger scale showing a detail of the molding tool of FIG. 3, for respective ones of three variants.

Figure 1:
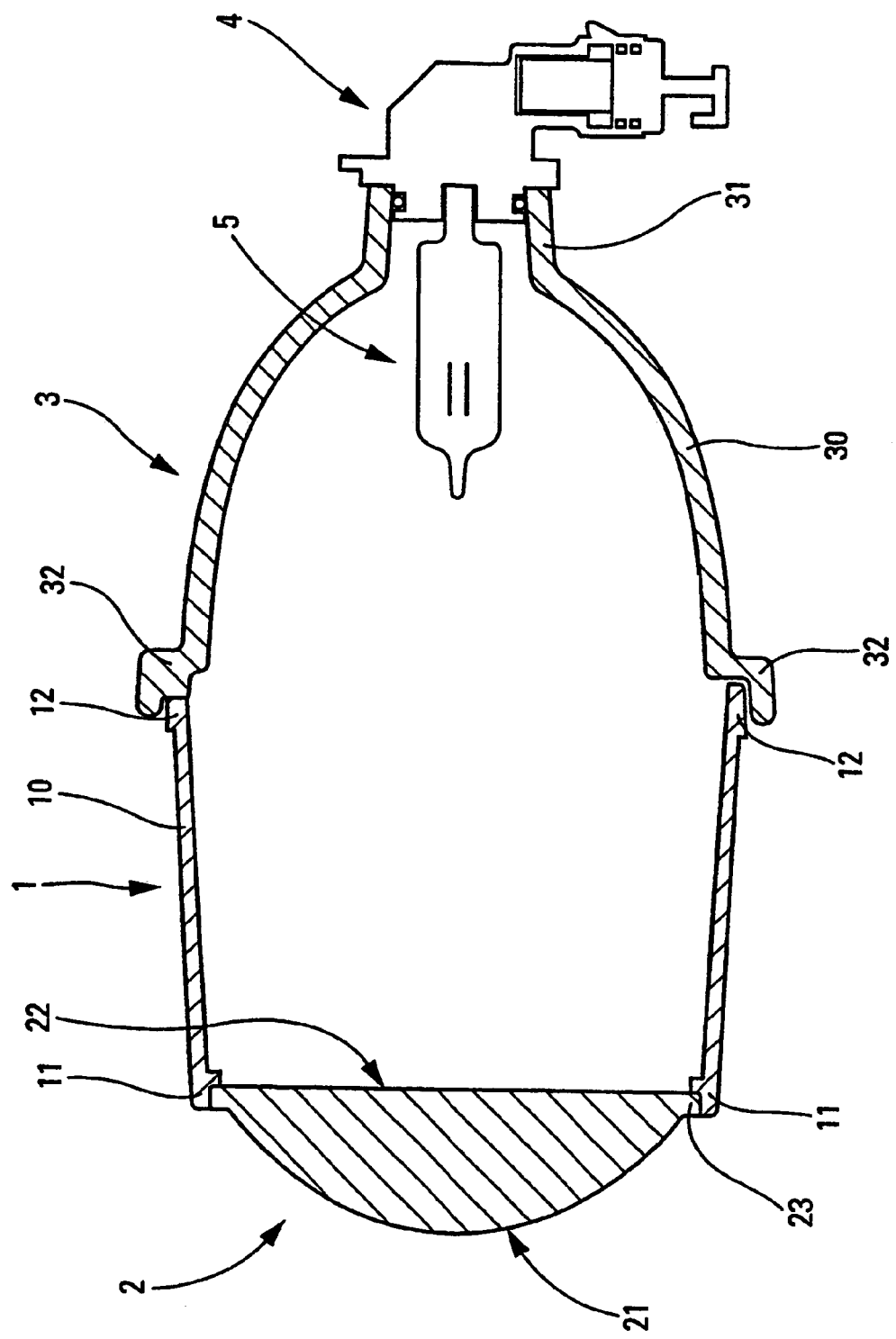
FIG. 1 is a diagrammatic section view through a lamp of the invention.

Reference is made firstly to FIG. 1 which shows a lamp that is designed more particularly to be used as a vehicle headlight. In conventional manner, this lamp comprises a reflector 3 forming a reflector body 30 defining a fixing peripheral edge 32 and an opening 31 at which a lamp holder 4 is mounted, which lamp holder is equipped with a bulb 5 that is positioned with precision inside the reflector 3. The reflector is preferably made of glass so as to withstand the high temperatures generated by the bulb. The reflector is further provided with a lens support 1 fixed via one of its ends 12 to the edge 32 of the reflector 3. The lens support 1 also has a body 10 which, at its end further from the edge 12, defines a fixing ring 11 to which a lens 2 is fixed. The lens is positioned with precision relative to the assembly formed by the reflector 3 and by the bulb 5. The fixing mode whereby the lens support 1 is fixed to the reflector 3 is not critical for the present invention and this fixing can thus be achieved by means of any fixing technique.

In the invention, the lens holder 1 is made of a plastics material, and preferably in one piece. In this example, the lens 2 is made of glass, but it could also be made of a suitable plastics material.

In the embodiment shown in the figures, the glass lens 2 has a plane rear face 22 facing towards the inside of the lamp, i.e. towards the reflector 3. In addition, the glass lens 2 has an optical front face 21, which is dome-shaped in this example, and which faces towards the outside of the lamp. In addition, the glass lens 2 is provided with a peripheral rim 23 which connects the rear face 22 to the front face 21. This is an entirely conventional configuration for a lens used in vehicle headlights. The rim 23 forms a rear portion 232 which is preferably situated in the same plane as the rear face 22. In fact, the rear portion of the rim 23 is formed by the outside peripheral edge of the rear face 22. In addition, the rim forms an edge portion 233 that extends around the entire lens and that therefore forms the outside edge of the lens. The rim 23 also forms a front portion 231 which surrounds the dome-shaped front face 21. Advantageously, the front portion 231 of and the rear portion 232 are substantially parallel so that the rim has a thickness that is substantially constant. However, the thickness of the rim cannot be manufactured with extreme precision: in practice, the tolerance on the thickness of the rim between its front portion 231 and its rear portion 232 is generally and conventionally approximately $3/10$ mm.

In the invention, the fixing ring 11 of the lens support 1 integrally forms a collar 111 which extends in contact with and around the edge portion 233 of the rim of the lens 2, and an abutment flange 112 which extends in contact with the rear portion 232 of the rim 23 of the lens 2. This can be seen in FIG. 1, but it can be seen much more clearly in FIG. 4a which is a view on a large scale showing the lens and its lens support inside the tool that serves to assemble them. It can thus be seen in FIG. 4a that the fixing ring 11 does not extend over the front portion 231 of the rim 23. However, in order to guarantee that the lens is fastened securely to the fixing ring 11, the edge portion 233 of the rim 23 is beveled or conical so that the rear portion 232 has a diameter that is larger than the diameter of the front portion 231. In this way, the edge portion 233 co-operates with the rear portion 232 to form a projecting wedge that guarantees that the rim is fastened in the fixing ring 11.

In this example, the rim 23 is circular, but it can also be oblong, elliptical, or polygonal.

With reference to FIG. 4b, which is a variant of FIG. 4a, it can be seen that the collar 111 of the fixing ring 11 is extended over the front portion 231 of the rim 23 by an inwardly-extending flange 111 which thus holds the rim 23 pressed against the abutment flange 112.

In FIG. 4c, which shows yet another variant, it can be seen that the rim 23 is provided with a notch 234 which, in this example, extends over a portion of the edge 233 and over the front portion 231 of the rim 23. The notch 234 does not extend into the rear portion 232. As for the fixing ring 11, its surrounding collar 111 forms a lug 112 that penetrates into the notch 234. This example gives merely one particular shape for the notch, and it is quite possible for said notch to extend to the rear portion 232 of the rim 23. The function of the notch is to prevent the lens from turning relative to the lens support. In addition, in the particular embodiment shown in FIG. 4c, the lug 234 acts to perform substantially the same function as the function performed by the inwardly-extending flange 112. Naturally, it is possible to provide one or more notches in the rim of the lens. It is also possible to imagine a notch that extends over the entire periphery of the rim.

In the invention, the particular embodiments of the fixing ring 11 of the lens support shown in FIGS. 4a to 4c are obtained by molding the lens support 1 over the lens 2. Naturally, the embodiments of FIGS. 4a to 4c should not be considered to be unique or limiting: other embodiments can be devised and implemented for the fixing ring 11 by using an overmolding technique and without going beyond the ambit of the invention.

Figure 2:
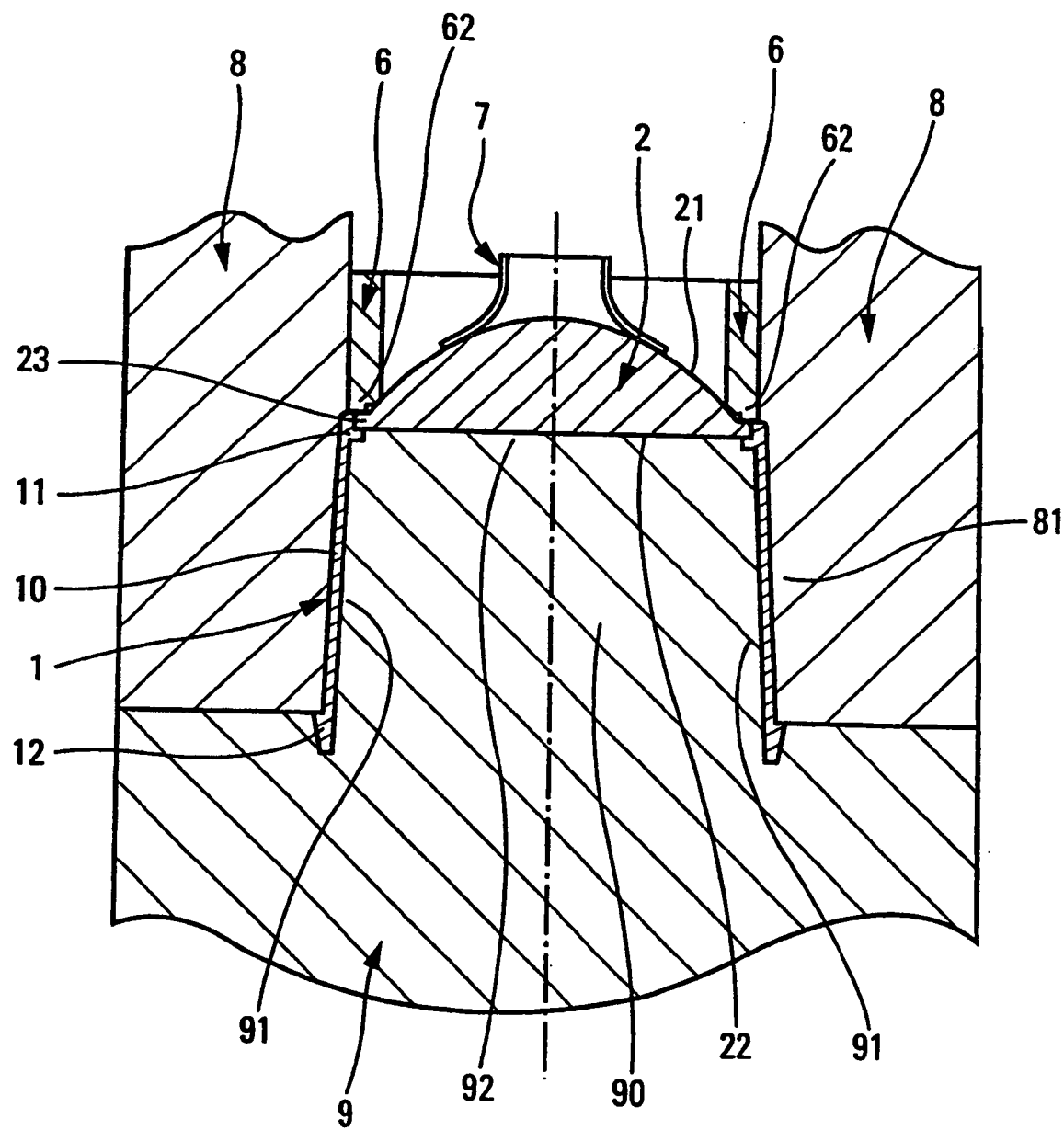
FIG. 2 is a section view through a first embodiment of an overmolding tool of the invention.
Figure 3:
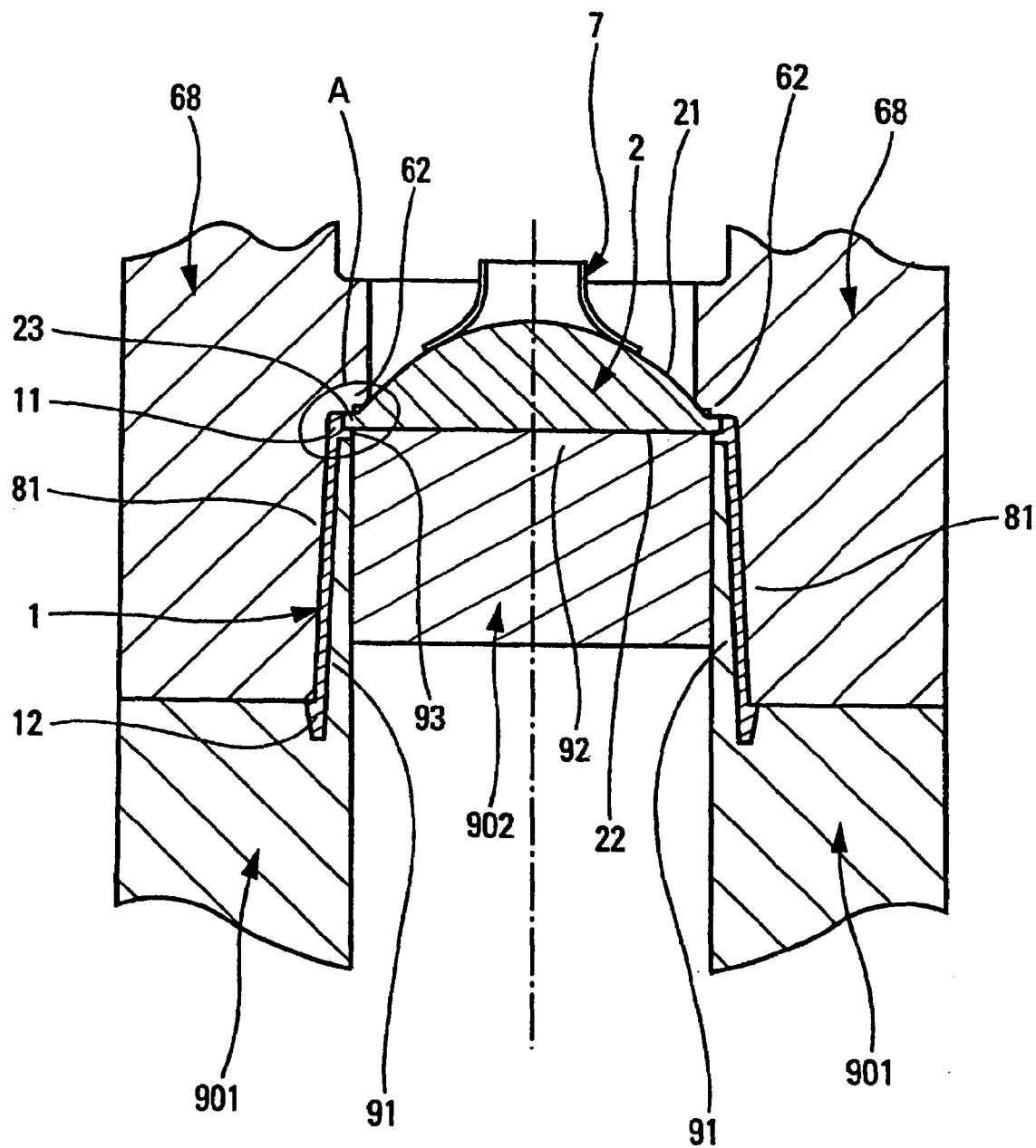
FIG. 3 is a view similar to the FIG. 2 view for a second embodiment of an overmolding tool of the invention.

In order to make such fixing rings 11, the invention also provides an overmolding tool which is described in two versions herein that can be seen respectively in FIGS. 2 and 3. However, the larger-scale detail views of FIGS. 4a to 4c are taken from the embodiment shown in FIG. 3 from the place referenced A. Indeed the molding tool of FIG. 3 can be considered to be the preferred embodiment or at least an advantageous embodiment.

With reference to FIG. 2, it can be seen that the first version of the molding tool comprises a hollow first mold element 8 which can, for example, be stationary. This first mold element 8 is provided with an internal cavity 81 serving to form the outside portion of the lens support 1. The stationary first mold element 8 is associated with a second mold element 9 which forms a central pin 90 defining a peripheral cavity insert 91 serving to form the inside portion of the lens support 1. In addition, said second mold element 9 forms a pushing surface 92 designed to come into pushing contact against the rear face 22 of the lens 2. The second mold element 9 is mounted to move relative to the stationary first mold element 8. In reaction to the thrust exerted by the second mold element 9, an abutment or bearing member 6 is provided that forms an abutment zone 62 which comes into reference contact against the lens 2 at its front face 21 and/or at the front portion 231 of the rim 23. A more detailed explanation is given with reference to FIG. 3 below. The abutment member 6 also defines an outside peripheral edge which is annular in this example, and which defines a cavity portion serving to form the annular top end face of the fixing ring 11. The abutment member 6 is mounted to move relative to the stationary first mold element 8. In addition, the abutment member 6 can be provided with a lens pick-up system 7 which can, for example, be in the form of a suction cup adapted to take hold of the lens at the top of its dome formed by the front face 21, as can be seen in FIG. 2.

Therefore, the outside portion of the lens support is formed by the first mold element 8 in combination with the abutment member 6 while the inside portion and the fixing peripheral edge 12 of the lens support 10 are formed by the moving second mold element 9 which has an additional function of pushing the lens against the abutment member 6 by means of its pushing surface 92.

In the invention, provision is made for the moving second mold element 9 to be provided with a thrust force regulation system making it possible to apply to the rear face 22 of the lens a constant thrust that is independent of the thickness of the rim, which thickness can vary due to manufacturing tolerance. It is thus guaranteed that the lens is always subjected to a pressing force that is constant and even, which force is naturally set to a value significantly lower than the value that might cause the lens to break. It is thus possible to guarantee a lens breakage rate that is zero or almost zero during the overmolding. In addition, by bearing against the optical front face 21 of the lens, which face is the optical reference that must be considered for its positioning relative to the light source, it is guaranteed that the lens is positioned with precision and exactly relative to the support 1. However, in the embodiment shown in FIG. 2, the peripheral edge 12 of the support 10 is formed by the moving second mold element 9, thereby inducing a small amount of imprecision during the assembly, if differences in thickness of the rim exist due to its tolerance of $3/10$ mm.

This problem is solved by the molding tool shown in FIG. 3. In this preferred version, the abutment member is formed integrally with or is at least secured to the stationary first mold element. This novel mold element is designated by the numerical reference 68 in FIG. 3 so as to express the combining of the elements 6 and 8 of FIG. 2. This mold element 68 is also stationary and it can also be provided with a pick-up system 7 in the form of suction cup. In this example, the moving second mold element 9 is made up of two portions so as to obtain a complementary mold element 901 and a pusher element 902. It can be said that the mold 9 of FIG. 2 has been subdivided into two portions so as to differentiate the mold function from the pusher function. The complementary mold element 901 has a cavity insert 91 which is advantageously identical to the cavity insert of the mold element 9 of FIG. 2, i.e. which serves to form the inside portion and the fixing edge 12 of the lens support 1. The complementary mold element 901 extends to the level of the abutment flange 112 so as to form the bottom face thereof.

The pusher element 902 also forms a pushing surface 92 designed to come into pushing contact with the rear face 22 of the lens 2 in order to push it against the abutment zones 62 which, with this version, are formed by the mold element 68, and into contact with the lens 2 at its front face 21 and at the rim 23, at the front portion 231 thereof. However, it should be remarked that the pusher member 902 forms an annular peripheral cavity insert 93 serving to form the substantially cylindrical inside peripheral edge 1120 of the abutment flange 112 of the lens support 1. All this can be seen much more clearly in FIG. 4a which is a view on a larger scale of the detail A of FIG. 3. In FIG. 4a, it is can be seen that stationary mold element 68 forms the mold cavity 81 for outside portion of the lens support 1, for the outside top peripheral edge at the wedge 628, and for the top end of the collar 111 at the surface 621. It can also be remarked that this surface 621 comes into contact with the front portion 231 of the rim 23. Beyond this annular surface 621, the mold element 68 defines a recess 624 formed by a step 622. The purpose of the recess 624 is to prevent the mold element 68 from coming into contact with the junction portion 213 that connects the dome of the front face 21 to the front portion 231 of the rim 23, due to lack of precision in forming it. The peripheral recess 624 makes it possible to prevent the lens from being positioned improperly relative to the mold element 68. In addition, the mold element 68 defines another abutment band 623 serving to come into contact with the dome-shaped front face 21 just after its junction 213 at which it meets the front portion 231. By means of these two reference contact zones, it is possible to guarantee that the lens is positioned accurately axially relative to the mold element 68. As shown in FIG. 4a, the pusher member 902 comes into contact with the rear face 22 via its pushing surface 92. It can also be seen that its portion 93 forms the edge 1120 of the abutment flange 112. Given that the pusher member 902 moves independently of the complementary mold element 901, whose position relative to the mold element 68 is stationary once the mold is closed, any variation in the thickness of the rim 23 of the lens merely increases or decreases the thickness of the abutment flange 112, given that the rear face 22 is spaced apart from the mold element 901 to an extent varying as a function of its thickness. Therefore, the fixing edge 12 of the lens support is always positioned the same distance away from the front portion 21 of the lens, regardless of the thickness of the rim 23. This does not apply with the overmolding tool of FIG. 2. It is even possible, with the overmolding tool of FIG. 3, to use a lens having manufacturing tolerance as regards thickness of the rim 23 that is greater than $3/10$ mm because the abutment flange 112 automatically and fully compensates for all of its thickness defects.

Like the mold element 9 of FIG. 2, the pusher element 902 of the tool of FIG. 3 is also provided with a thrust force regulation system which makes it possible to apply thrust to the lens that is of predetermined and fixed value. Thus, any risk of the lens breaking during overmolding is avoided.

By means of the overmolding technique, advantageously using an overmolding tool of the invention, a pre-assembled lens support subassembly is obtained that offers high precision as regards the positioning of the lens relative to the fixing edge 12 of the support. In addition, no subsequent assembly operations are required for assembling the lens to the support because the lens is assembled to the support at the same time as the support is being manufactured. In addition, there is no risk of the lens breaking during overmolding. Since it is an overmolding technique, this operation can easily be automated or robotized, thereby guaranteeing constant and excellent quality for the pre-assembled assembly made up of the lens and of the support. Finally, it is possible, with this overmolding technique, to obtain excellent sealing for the lens at its rim. For example, this can be advantageous for lamps used outdoors, e.g. fog lamps. Another advantage lies in the fact that the lens can be angularly positioned relative to its support by using the embodiment of FIG. 4c, for example. Naturally, angularly positioning the lens in the molding tool can be achieved in automated manner.

The plastics material of which the lens support is made is preferably transparent or translucent so as to improve removal of the heat generated by the source (bulb) inside the lamp. The lens support can also be metal-plated.

The invention claimed is:

1. A motor vehicle headlight lamp including an overmolded lens support (1) overmolded onto a glass lens (2) designed to be placed in front of a light source (5), said lens being assembled to the lens support which is secured to the light source, said support being made of a moldable material, said lens having a rear face (22) designed to face towards the light source, an optical front face (21), and a peripheral rim (23) which interconnects the rear face and the front face, the lens support coming into engagement with the lens at said rim;
wherein the peripheral rim includes an edge and the moldable material contacts the entire edge to couple the lens to the lens support.

2. A lamp according to claim 1, in which the rim (23) has an annular rear portion (232) which advantageously extends in the same plane as the substantially plane rear face (22), an annular front portion (231) which extends around the front face (21), and an edge portion (233) which interconnects the rear portion and the front portion, the lens support (1) coming into contact, at least in part, with the rear portion (232) and with the edge portion (233) of the rim (23).

3. A lamp according to claim 2, in which the lens support (1) extends over the front portion (231) of the rim (23) at least in part.

4. A lamp according to claim 2, in which the edge portion (233) of the rim tapers towards the front portion.

5. A lamp according to claim 2, in which the rim (23) is provided with at least one notch (234) formed into the rim to prevent the rotation of the lens.

6. A lamp according to claim 5, in which the notch (234) is formed in the front portion (231) and in the edge portion (233) without extending to the rear portion (232).

7. A vehicle headlight according to claim 1, including a reflector (3) in which the light source (5) is placed, the lens support being fixed to the reflector.

8. A lamp according to claim 1, in which the lens support (1) is made of a transparent or translucent plastics material.

9. A lamp according to claim 1, in which the lens support (1) is metal-plated.

10. A motor vehicle headlight lamp, comprising
a light source;
an overmolded lens support; and
a glass lens positioned in front of the light source, the lens comprising a rear face facing the light source, a front face, and a peripheral rim interconnecting the rear face and the front face;
wherein the lens support is molded over the rim of the lens with a tight contact at every position.

11. The lamp according to claim 10, wherein the rim comprises an annular rear portion extending substantially in the same plane containing the rear face, an annular front portion, and an edge portion connecting the rear portion with the front portion, and wherein the lens support is overmolded onto the rim so as to contact the rear portion and the edge portion of the rim.

12. The lamp according to claim 11, wherein the lens support is overmolded onto the rim so as to extend over at least part of the front portion of the rim.

13. The lamp according to claim 11, wherein the edge portion of the rim tapers towards the front portion.

14. The lamp according to claim 11, wherein the rim comprises at least one notch that prevents the lens from rotating relative to the lens support.

15. The lamp according to claim 10, wherein the lens support is made of a transparent or translucent plastic material.

16. The lamp according to claim 10, wherein the lens support is metal-plated.

17. The lamp according to claim 10, wherein the lens support comprises only one radial inwardly extending flange that engages the rim.

* * * * *